US010110288B2

(12) United States Patent
Dutta

(10) Patent No.: US 10,110,288 B2
(45) Date of Patent: Oct. 23, 2018

(54) FREQUENCY DIVISION DUPLEX (FDD) RETURN LINK TRANSMIT DIVERSITY SYSTEMS, METHODS AND DEVICES USING FORWARD LINK SIDE INFORMATION

(75) Inventor: Santanu Dutta, Vienna, VA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 1071 days.

(21) Appl. No.: 12/720,189

(22) Filed: Mar. 9, 2010

(65) Prior Publication Data

US 2011/0103273 A1    May 5, 2011

Related U.S. Application Data

(60) Provisional application No. 61/257,913, filed on Nov. 4, 2009.

(51) Int. Cl.
  *H04B 7/06*  (2006.01)
  *H04B 7/08*  (2006.01)

(52) U.S. Cl.
  CPC ......... *H04B 7/0608* (2013.01); *H04B 7/0691* (2013.01); *H04B 7/0877* (2013.01); *H04B 7/0604* (2013.01); *H04B 7/0871* (2013.01)

(58) Field of Classification Search
  CPC .................................................. H04B 7/0608
  USPC ....... 370/316, 318, 319, 328, 329, 338, 344, 370/334; 375/244, 283, 318, 330, 267, 375/299, 347; 455/13.3, 13.4, 522
  See application file for complete search history.

(56) References Cited

U.S. PATENT DOCUMENTS

| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |

(Continued)

FOREIGN PATENT DOCUMENTS

| EP | 0 506 255 A2 | 9/1992 |
| EP | 0 506 255 A3 | 9/1992 |

(Continued)

OTHER PUBLICATIONS

Written Opinion of the International Preliminary Examining Authority, PCT Application No. PCT/US2010/054907, dated Nov. 22, 2011.

(Continued)

*Primary Examiner* — Hassan Kizou
*Assistant Examiner* — Deepa Belur
(74) *Attorney, Agent, or Firm* — Michael Best & Friedrich LLP

(57) ABSTRACT

A Frequency Division Duplex (FDD) wireless terminal includes spaced-apart antennas that are configured to transmit over a return link and to receive over a forward link that is spaced apart from the return link in frequency. The FDD wireless terminal is configured to selectively refrain from transmitting over the return link from at least one of the spaced-apart antennas of the FDD wireless terminal in response to differentials in forward link power that is received at the spaced-apart antennas of the FDD wireless terminal, that are caused, for example, by blocking appendages of a user of the wireless terminal. Related methods are also described.

17 Claims, 5 Drawing Sheets

(56) References Cited

U.S. PATENT DOCUMENTS

| | | |
|---|---|---|
| 5,448,623 A | 9/1995 | Wiedeman et al. |
| 5,475,677 A | 12/1995 | Arnold et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 * | 2/2005 | Karabinis et al. ............ 455/427 |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,107,021 B2 * | 9/2006 | Kim et al. .................... 455/101 |
| 7,113,743 B2 | 9/2006 | Karabinis |
| 7,113,778 B2 | 9/2006 | Karabinis |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,453,920 B2 | 11/2008 | Churan |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,577,400 B2 | 8/2009 | Karabinis et al. |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 7,599,656 B2 | 10/2009 | Karabinis |
| 7,603,081 B2 | 10/2009 | Karabinis |
| 7,603,117 B2 | 10/2009 | Karabinis |
| 7,606,590 B2 | 10/2009 | Karabinis |
| 7,609,666 B2 | 10/2009 | Karabinis |
| 7,620,394 B2 | 11/2009 | Good et al. |
| 7,623,859 B2 | 11/2009 | Karabinis |
| 7,623,867 B2 | 11/2009 | Karabinis |
| 7,627,285 B2 | 12/2009 | Karabinis |
| 7,634,229 B2 | 12/2009 | Karabinis |
| 7,634,234 B2 | 12/2009 | Karabinis |
| 7,636,546 B2 | 12/2009 | Karabinis |
| 7,636,566 B2 | 12/2009 | Karabinis |
| 7,636,567 B2 | 12/2009 | Karabinis et al. |
| 7,636,573 B2 * | 12/2009 | Walton et al. ............... 455/454 |
| 7,639,981 B2 | 12/2009 | Karabinis |
| 7,653,348 B2 | 1/2010 | Karabinis |
| 7,660,598 B2 * | 2/2010 | Barnett et al. ............... 455/522 |
| 7,664,460 B2 | 2/2010 | Karabinis et al. |
| 8,654,715 B2 * | 2/2014 | Wang et al. .................. 370/329 |
| 9,755,710 B2 * | 9/2017 | Murakami .......... H04B 7/0413 |
| 9,929,794 B2 * | 3/2018 | Rowland ............ H04B 7/18506 |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0149986 A1 | 8/2003 | Mayfield et al. |
| 2004/0072539 A1 | 4/2004 | Monte et al. |
| 2004/0102156 A1 | 5/2004 | Loner |
| 2004/0121727 A1 | 6/2004 | Karabinis |
| 2004/0203393 A1 | 10/2004 | Chen |
| 2004/0235433 A1 * | 11/2004 | Hugl et al. .................... 455/101 |
| 2004/0240525 A1 | 12/2004 | Karabinis et al. |
| 2005/0041619 A1 | 2/2005 | Karabinis et al. |
| 2005/0090256 A1 | 4/2005 | Dutta |
| 2005/0095987 A1 * | 5/2005 | Lyons et al. ............... 455/67.13 |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0181786 A1 | 8/2005 | Karabinis et al. |
| 2005/0201449 A1 | 9/2005 | Churan |
| 2005/0227618 A1 | 10/2005 | Karabinis et al. |
| 2005/0239399 A1 | 10/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0288011 A1 | 12/2005 | Dutta |
| 2006/0040613 A1 | 2/2006 | Karabinis et al. |
| 2006/0072524 A1 * | 4/2006 | Perahia .................. H04L 25/022 370/338 |
| 2006/0094420 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135070 A1 | 6/2006 | Karabinis |

(56) References Cited

U.S. PATENT DOCUMENTS

| | | |
|---|---|---|
| 2006/0165120 A1 | 7/2006 | Karabinis |
| 2006/0189275 A1 | 8/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0217070 A1 | 9/2006 | Karabinis |
| 2006/0246838 A1 | 11/2006 | Karabinis |
| 2006/0252368 A1 | 11/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0184849 A1 | 8/2007 | Zheng |
| 2007/0192805 A1 | 8/2007 | Dutta et al. |
| 2007/0202816 A1 | 8/2007 | Zheng |
| 2007/0232298 A1 | 10/2007 | Karabinis |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0032690 A1 | 2/2008 | Karabinis |
| 2008/0113666 A1 | 5/2008 | Monte et al. |
| 2008/0119190 A1 | 5/2008 | Karabinis |
| 2008/0151798 A1* | 6/2008 | Camp ........................ 370/311 |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0040100 A1 | 2/2009 | Levin et al. |
| 2009/0042509 A1 | 2/2009 | Karabinis et al. |
| 2009/0042516 A1 | 2/2009 | Karabinis |
| 2009/0075645 A1 | 3/2009 | Karabinis |
| 2009/0088151 A1 | 4/2009 | Karabinis |
| 2009/0104903 A1 | 4/2009 | Karabinis |
| 2009/0131046 A1 | 5/2009 | Karabinis et al. |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0264120 A1 | 10/2009 | Karabinis |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0015971 A1 | 1/2010 | Good et al. |
| 2010/0035605 A1 | 2/2010 | Karabinis |
| 2010/0035606 A1 | 2/2010 | Karabinis |
| 2010/0246516 A1* | 9/2010 | Pelletier et al. .............. 370/329 |
| 2010/0322328 A1* | 12/2010 | Schirmacher ........ H04B 7/0404 |
| | | 375/260 |
| 2011/0044376 A1* | 2/2011 | Lin ...................... H04B 7/0608 |
| | | 375/130 |
| 2012/0002630 A1* | 1/2012 | Bergman et al. ............. 370/329 |
| 2012/0009968 A1* | 1/2012 | Kludt et al. .................. 455/522 |
| 2012/0294384 A1* | 11/2012 | Wilcoxson ............ H04L 1/0002 |
| | | 375/285 |
| 2014/0079155 A1* | 3/2014 | Wang et al. .................. 375/299 |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 463 215 A2 | 9/2004 |
| EP | 1 715 600 A1 | 10/2006 |
| EP | 1 906 553 A1 | 4/2008 |
| EP | 1 944 885 A2 | 7/2008 |
| EP | 1 569 363 B1 | 11/2008 |
| EP | 2 015 467 A2 | 1/2009 |
| WO | WO 01/54314 A1 | 7/2001 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

International Preliminary Report on Patentability, PCT Application No. PCT/US2010/054907, dated Jan. 12, 2012.

Notification of Transmittal of the International Search Report and the Written Opinion of the International Searching Authority, or the Declaration; International Search Report; Written Opinion of the International Searching Authority corresponding to International Application No. PCT/US2010/054907; dated Feb. 21, 2011; 14 pages.

GeekInterview.com, "What is 1×EV-DV Standard", downloaded May 13, 2013 from http://www.learn.geekinterview.com/it/wireless/what-is-1xev-dv-standard.html, 2 pp.

* cited by examiner

FREQUENCY DIVISION DUPLEX (FDD) RETURN LINK TRANSMIT DIVERSITY SYSTEMS, METHODS AND DEVICES USING FORWARD LINK SIDE INFORMATION

CROSS-REFERENCE TO RELATED APPLICATION

This application claims the benefit of U.S. Provisional Application No. 61/257,913, filed Nov. 4, 2009, the disclosure of which is hereby incorporated herein by reference in its entirety as if set forth fully herein.

BACKGROUND OF THE INVENTION

This invention relates to wireless communications systems, methods and devices and, more particularly, to satellite and terrestrial wireless communications systems, methods and devices.

Cellular wireless communications systems, methods and devices are widely used for voice, multimedia and/or data communications. As is well known to those having skill in the art, cellular wireless communications systems, methods and devices include terrestrial cellular wireless communications systems, methods and devices and satellite cellular wireless communications systems, methods and devices.

In cellular wireless communications systems, methods and devices, a plurality of cells are provided, each of which can serve a portion of an overall service region, to collectively provide service to the overall service region. A wireless terminal communicates with a base station (a terrestrial base station or a satellite) over bidirectional communication pathways. Wireless communication signals are communicated from the satellite or terrestrial base station over a downlink or forward link (also referred to as a "forward service link"); and wireless communications signals are communicated from the wireless terminal to the satellite or terrestrial base station over an uplink, return link or reverse link (also referred to as a "return service link"). The overall design and operation of cellular wireless communications systems, methods and devices are well known to those having skill in the art, and need not be described further herein.

As used herein, the term "wireless terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) or smart phones that can include a radio frequency transceiver and a pager, Internet/Intranet access, Web browser, organizer, calendar and/or a global positioning system (GPS) receiver; and/or conventional laptop (notebook) and/or palmtop (netbook) computers or other appliances, which include a radio frequency transceiver. As used herein, the term "wireless terminal" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). A wireless terminal also may be referred to herein as a "radiotelephone," a "radioterminal," a "mobile terminal," a "wireless user device," a "terminal," "a handset," a "cell phone" or variants thereof. Furthermore, as used herein, the term "satellite" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude. Finally, the term "base station" includes any fixed, portable or transportable device that is configured to communicate with one or more wireless terminals, and includes, for example, terrestrial cellular base stations (including microcell, picocell, wireless access point and/or ad hoc communications access points) and satellites, that may be located terrestrially and/or that have a trajectory above the earth at any altitude.

Diversity combining techniques, involving multiple spaced-apart transmit and/or receive antennas, are playing an increasing role in modern wireless communication systems, in particular 3G and 4G cellular systems. While receive diversity combining has been used for many years in different forms of radio communication, more recently, transmit diversity has also been gaining in popularity.

Transmit diversity systems are generally more complex than receive diversity systems. One reason for this complexity is that, in a receive diversity system, one can collect physically separate sets of diversified samples from physically separate (i.e., spaced apart) antennas, and the samples can then be combined according to different signal processing techniques to meet desired goals, such as increasing or maximizing signal-to-noise ratio, reducing or minimizing mean squared error relative to a pilot signal, etc. In contrast, a transmit diversity system is configured to launch signals from multiple spaced-apart transmit antennas such that, at a receive antenna, the received signal quality, after signal processing, provides an improvement over that which would be obtained with a single transmit antenna. Obtaining separable copies of the channel signals at the receiver is generally more challenging for transmit diversity.

Transmit diversity techniques can be categorized as follows: (i) co-frequency signals are transmitted simultaneously from multiple transmit antennas such that the signals are separable at a receiver signal processor, the separated copies being combined according to a chosen optimization criterion (the so called "Alamouti" method); (ii) achieving separability at the receiver through frequency diversity in the transmit signals; and (iii) switched transmit diversity, where the transmit signal is selectively transmitted from one of a multiplicity of antennas. In switched transmit diversity, the transmit antenna is selected which, it is anticipated, will offer a superior channel to the receive antenna.

While techniques (i) and (ii) may offer better performances than (iii), both (i) and (ii) generally use two or more separate transmit chains, depending on the order of the diversity system. While this may not be an excessive burden in a base station, it may be much more of a burden in a wireless terminal, which may be limited in form factor and/or battery power.

Therefore, switched transmit diversity may be favored in the return links (wireless terminal to base station) of cellular and mobile satellite communication systems. In a Time Division Duplex (TDD) system, in which forward and return links can use the same frequencies at different times, strong correlation generally exists between forward and return links if the TDD frame duration (a period of time encompassing at least one cycle of forward and return transmission) is sufficiently small. In contrast, in a Frequency Division Duplex (FDD) system, in which forward and return links use different (spaced-apart) frequencies, the frequency separation between forward and return links may be too great to provide high correlation between the forward and return channel transfer functions, when the transfer function is based exclusively on a multipath profile.

The above-described difficulty in using switched transmit diversity in FDD systems is illustrated in FIGS. 1A and 1B. In FIG. 1A, a wireless terminal 110, including two spaced-apart antennas 112 and 114, communicates with a terrestrial base station 120. In FIG. 1B, a wireless terminal 110, including two spaced-apart antennas 112 and 114, communicates with a satellite 130. It will be understood that FIGS. 1A and 1B may illustrate two separate terrestrial and satellite radiotelephone systems, a dual mode system in which a given wireless terminal 110 can communicate with a terrestrial base station 120 using terrestrial frequencies in a first mode and with a satellite 130 using satellite frequencies in a second mode, or a hybrid system in which satellite frequencies are used or reused for terrestrial communications with a terrestrial base station 120, which may also be referred to as an Ancillary Terrestrial Component (ATC). These hybrid systems are described, for example, in U.S. Pat. Nos. 7,636,567; 7,636,566; 7,634,234; 7,623,867; 7,603,117; and 7,418,263, that are assigned to the assignee of the present application, the disclosures of which are hereby incorporated herein by reference in their entirety as if set forth fully herein.

Referring to FIGS. 1A and 1B, for a given multipath profile, which is described mathematically by the impulse response of the channel, h(t), the channel frequency response, H($\omega$) (which is the Fourier transform of h(t)), may vary widely between the transmit and receive frequencies, even when h(t) is substantially invariant between the forward and return paths. Furthermore, it is noteworthy that, in some cases, h(t) may vary between the transmit and receive frequencies, e.g. when the multipath reflectivity is frequency dependent. For example, assume that $H_{fwd,1}(\omega1)$ and $H_{fwd,2}(\omega1)$ were the observed channel frequency responses in the forward direction from one terrestrial and/or satellite base station antenna to two receive antennas 112 and 114 on a given FDD wireless terminal 110, at the forward FDD frequency, $\omega1$. Assume further that $H_{ret,1}(\omega2)$ and $H_{ret,2}(\omega2)$ were the corresponding return channel frequency responses at the return FDD frequency, $\omega2$. Typically, $H_{fwd,1}(\omega1)$ is not equal to $H_{ret,1}(\omega2)$ and $H_{fwd,2}(\omega1)$ is not equal to $H_{ret,2}(\omega2)$, even when $h_{fwd,1}(t)=h_{ret,1}(t)$ and $h_{fwd,2}(t)=h_{ret,2}(t)$; this is due to separation of the forward link frequency and the return link frequency. Therefore, in an FDD system, as per present practice, a particular return channel is typically not selected for switched diversity return link transmission by measurements on a set of forward channels.

In summary, for typical duplexing frequency differences, the superior channel in the forward direction will not always be the superior channel in the return direction, when the channel differences are caused primarily by the multipath profile. An implicit assumption in this practice is that the mean antenna gain, averaged over angles-of arrival relevant to the propagation scenario, are similar. This has led to the practice of not using forward-link channel estimation to determine return antenna selection in transmit diversity systems.

SUMMARY OF THE INVENTION

Various embodiments described herein can provide transmit diversity methods for a Frequency Division Duplex (FDD) wireless terminal. The FDD wireless terminal comprises a plurality of spaced-apart antennas that are configured to transmit over a return link and to receive over a forward link that is spaced apart from the return link in frequency. These transmit diversity methods comprise selectively refraining from transmitting over the return link from at least one of the plurality of spaced-apart antennas of the FDD wireless terminal in response to channel estimating of the forward link that is received at the plurality of spaced-apart antennas of the FDD wireless terminal. In some embodiments, the channel estimating of the forward link that is received at the plurality of spaced-apart antennas of the FDD wireless terminal comprises estimating differential blockages of the forward link at the plurality of spaced-apart antennas of the FDD wireless terminal that are caused, for example, by appendages of a user, such as the hand and/or head of the user, of the FDD wireless terminal. These differential blockages may be used to determine which antenna(s) should be used for switched transmit diversity purposes.

In some embodiments, the channel estimating of the forward link that is received by the plurality of spaced-apart antennas of the FDD wireless terminal comprises measuring forward link power at the plurality of spaced-apart antennas of the FDD wireless terminal over an averaging period. The averaging period may be configured by a wireless network and transmitted to the FDD wireless terminal and/or may be configured by the FDD wireless terminal itself. The differential blockages may be estimated by estimating differential gains of the plurality of spaced-apart antennas of the FDD wireless terminal, averaged over angles of arrival of the forward link.

In some embodiments, estimating differential blockages of the forward link at the plurality of spaced-apart antennas of the FDD wireless terminal may comprise determining blockage differentials among the plurality of spaced-apart antennas. In other embodiments, blockage levels may be determined at the plurality of spaced-apart antennas of the FDD wireless terminal relative to a threshold blockage level. These embodiments may include selectively refraining from transmitting over the return link from at least one of the plurality of spaced-apart antennas of the FDD wireless terminal that has a blockage level that is greater than the threshold blockage level. In other embodiments, it may be determined that all of the plurality of spaced-apart antennas of the FDD wireless terminal have blockage levels greater than the differential blockage level, and transmission may take place over an antenna of the FDD wireless terminal having a lowest blockage level. In other embodiments, it may determined that only one of the antennas has a blockage level less than the threshold blockage level, and transmitting may take place over only the one antenna of the FDD wireless terminal. In still other embodiments, it may be determined that two or more of the antennas of the FDD wireless terminal have blockage levels less than the threshold blockage level, and alternating transmission may take place over the two or more antennas of the FDD wireless terminal.

Transmit diversity methods according to various other embodiments may be used by an FDD wireless terminal. The FDD wireless terminal includes a plurality of spaced-apart antennas that are configured to transmit over a return link and to receive over a forward link that is spaced apart from the return link in frequency. The transmit diversity methods may comprise selectively refraining from transmitting over the return link from at least one of the plurality of spaced-apart antennas of the FDD wireless terminal in response to differentials in forward link power that is received at the plurality of spaced-apart antennas of the FDD wireless terminal. In some embodiments, the differentials in forward link power that is received at the plurality of spaced-apart antennas of the FDD wireless terminal are caused by blocking appendages of a user of the FDD wireless terminal.

In other embodiments, the plurality of antennas of the FDD wireless terminal consists of two antennas of the FDD wireless terminal, and selectively refraining from transmitting comprises alternating transmitting between the two antennas of the FDD wireless terminal over the return link in response to differentials in forward link power that is received at the two antennas of the FDD wireless terminal being less than a threshold, and refraining from transmitting over the return link from one of the two antennas of the FDD wireless terminal in response to differentials in forward link power that is received at the two antennas of the FDD wireless terminal exceeding the threshold.

In other embodiments, the plurality of antennas of the FDD wireless terminal comprises three or more antennas of the FDD wireless terminal, and selectively refraining from transmitting comprises alternating transmitting between at least two of the antennas of the FDD wireless terminal over the return link in response to the forward link power that is received at the at least two antennas of the FDD wireless terminal exceeding a threshold; transmitting from only one antenna of the FDD wireless terminal over the return link in response to the forward link power that is received at the only one antenna of the FDD wireless terminal exceeding the threshold; and/or transmitting from only one of the antennas of the FDD wireless terminal having a highest forward link power in response to the forward link power that is received at all of the antennas of the FDD wireless terminal being less than the threshold.

Various embodiments have been described above in connection with transmit diversity methods for FDD wireless terminals. In other embodiments, an FDD wireless terminal may comprise a plurality of spaced-apart antennas, a transmitter that is configured to transmit over a return link from the plurality of spaced-apart antennas of the FDD wireless terminal, a receiver that is configured to receive over a forward link that is spaced apart from the return link in frequency, from the plurality of spaced-apart antennas of the FDD wireless terminal, and a processor. In some embodiments, the processor is configured to control the transmitter to selectively refrain from transmitting over the return link from at least one of the plurality of spaced-apart antennas of the FDD wireless terminal in response to channel estimating of the forward link that is received at the plurality of spaced-apart antennas of the FDD wireless terminal. In other embodiments, the processor is configured to control the transmitter to selectively refrain from transmitting over the return link from at least one of the plurality of spaced-apart antennas of the FDD wireless terminal in response to differentials in forward link power that is received at the plurality of spaced-apart antennas of the FDD wireless terminal. The processor may be further configured to control the transmitter to perform operations according to the various other embodiments described above.

DETAILED DESCRIPTION

Figure 1A:
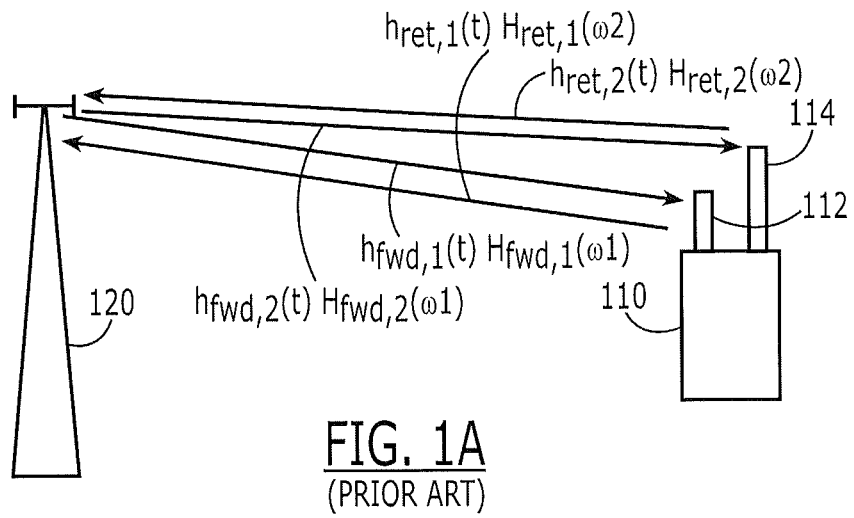
FIG. 1A is a block diagram illustrating forward and return channel impulse responses and frequency responses for a conventional wireless terminal having two antennas and communicating with a terrestrial base station.
Figure 1B:
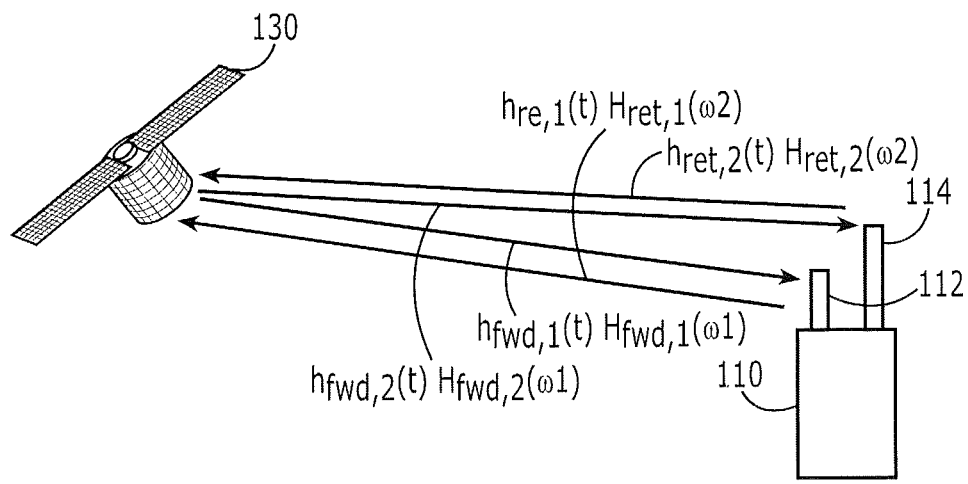
FIG. 1B is a block diagram illustrating forward and return channel impulse responses and frequency responses for a conventional wireless terminal having two antennas and communicating with a satellite.

Specific embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive. In contrast, the term "directly" means that there are no other intervening elements.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," and variants thereof when used in this specification, specify the presence of stated features, integers, steps, operations, elements, and/or components, but do not preclude the presence or addition of one or more other features, integers, steps, operations, elements, components, and/or groups thereof. In contrast, the term "consisting of" and variants thereof when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

The present invention is described in part below with reference to block diagrams and flowcharts of methods, systems and computer program products according to various embodiments. It will be understood that a block of the block diagrams or flowcharts, and combinations of blocks in the block diagrams or flowcharts, may be implemented at least in part by computer program instructions. These computer program instructions may execute on a processor of an FDD wireless terminal and/or a processor of a base station, such that the instructions, which execute via the processor(s) create means, modules, devices and/or methods for implementing the functions/acts specified in the block diagram block or blocks. Combinations of general purpose computer systems and/or special purpose hardware may be used in some embodiments.

These computer program instructions may also be stored in memory of the processor(s) that can direct the FDD wireless terminal and/or base station to function in a particular manner, such that the instructions stored in the memory produce an article of manufacture including computer-readable program code which implements the functions/acts specified in block or blocks. The computer program instructions may also be loaded into the processor(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products, devices and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

According to various embodiments described herein, in certain operational scenarios and using certain information processing techniques, forward channel estimation can in fact be used advantageously for return link transmit diversity.

In wireless terminals designed for use in cellular systems, the degrees of freedom available for antenna placement are often limited. The patterns of the antennas are typically irregular and may have peak gains that may not be optimum for direct line-of-sight communication with base stations. These antenna patterns may be used because a direct line-of-sight to the transmitter is generally unnecessary in terrestrial cellular links, which are designed to operate adequately with multipath signals. For example, terrestrial cell phones sometimes have patterns with peak gains pointing towards the ground. Moreover, cellular handsets are designed to operate with sufficient link margin even when the antenna is partially blocked by a hand.

There is also current interest in hybrid, terrestrial-satellite networks using common, so called "transparency devices," which are wireless terminals that look and feel like purely cellular devices but are capable of communicating directly with satellites and/or with terrestrial base stations (ATCs) using satellite frequencies. In these hybrid systems, it is also of interest to not burden the wireless terminal with special, satellite-based requirements in terms of antenna size and layout, so as to keep the wireless terminal cost low and the aesthetics competitive with those of purely terrestrial cell phones. Thus, these hybrid wireless terminals may not use a large quadrifilar-helix antenna as is found in some legacy mobile satellite devices, or may even dispense with external antennas as is now customary with cellular handsets.

Figure 2A:
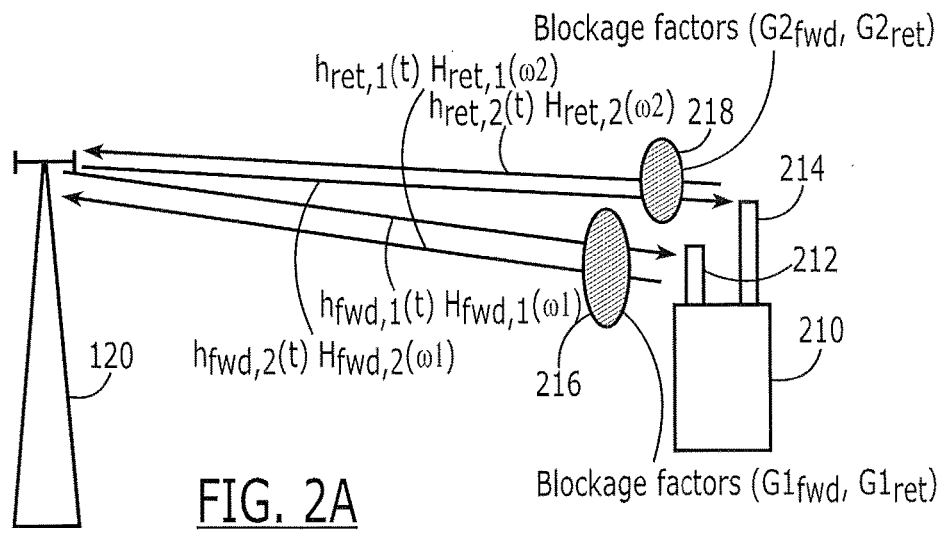
FIG. 2A is a block diagram illustrating forward and return channel impulse responses and frequency responses for an FDD wireless terminal having two differently blocked antennas and communicating with a terrestrial base station according to various embodiments described herein.
Figure 2B:
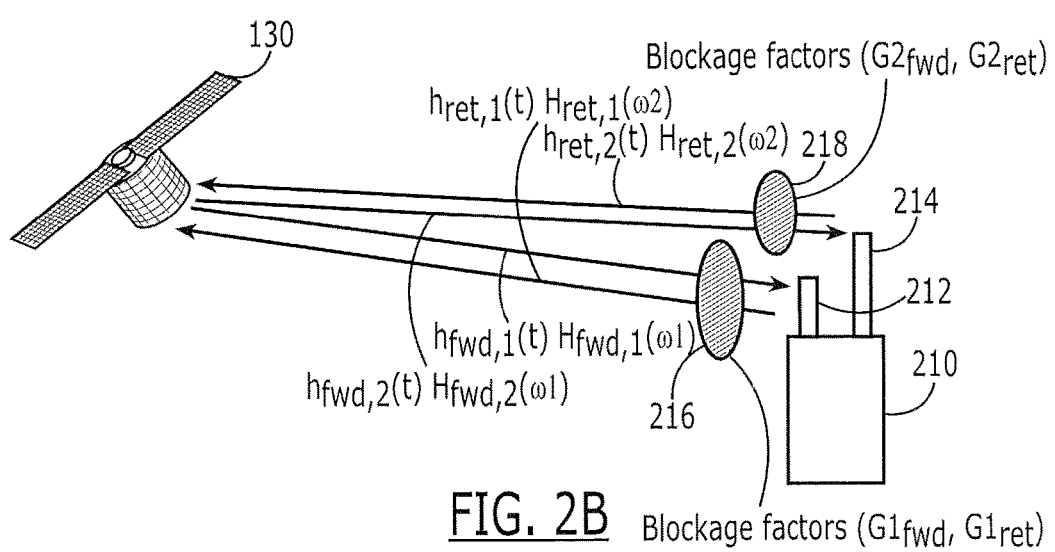
FIG. 2B is a block diagram illustrating forward and return channel impulse responses and frequency responses for an FDD wireless terminal having two differently blocked antennas and communicating with a satellite according to various embodiments described herein.

Given the cellular-driven design environment and practices described above, if two antennas are placed on a handset for implementing switched transmit diversity and used on a mobile satellite link, it is quite likely that one of the antennas would have more head and/or hand blockage than the other. This blockage is illustrated in FIGS. 2A and 2B. As shown in FIG. 2A, an FDD wireless terminal 210 having two spaced-apart antennas 212 and 214 communicates bidirectionally with a terrestrial base station 120 using terrestrial and/or satellite frequencies. As shown in FIG. 2B, an FDD wireless terminal 210 having two spaced-apart antennas 212 and 214 communicates bidirectionally with a satellite 130. It will be understood that the two antennas may be the same or different in size, shape and/or technology, or may have a similar size, shape and/or technology. The two spaced-apart antennas 212 and 214 may also be embodied by two separate feed points in a single antenna structure. Moreover, a given FDD wireless terminal 210 may operate in a hybrid system as shown in FIGS. 2A and 2B, in a dual mode wherein operations of FIGS. 2A and 2B may be performed separately, or in a terrestrial-only mode (FIG. 2A) or a satellite-only mode (FIG. 2B).

FIGS. 2A and 2B illustrate unequal blockage factors 216 and 218, respectively, for the two spaced-apart antennas 212 and 214, respectively. The blockage factors may be functions of frequency and, hence, may be unequal for the forward and return directions for a given antenna of the FDD wireless terminal. Nevertheless, when the blockage is caused by a physical obstruction, such as an appendage (e.g., head and/or hand of the user of the FDD wireless terminal 210), it is very likely that $G1_{fwd}$ and $G1_{ret}$ may both be significantly greater or smaller than either $G2_{fwd}$ and $G2_{ret}$. Thus, it may be possible, from observations of the time-averaged signal power levels received by antennas 212 and 214 of the FDD wireless terminal, and comparing them to expected values, to determine if the two antennas of the FDD wireless terminal are facing differential blockage. In such cases, various embodiments described herein can advantageously use the less blocked antenna of the FDD wireless terminal. In contrast, when the blockages levels are similar, or insignificant for both antennas 212 and 214 of the FDD wireless terminal, various embodiments described herein can transmit with substantially equal duty cycle on both antennas 212 and 214 of the FDD wireless terminal. This is referred to as blind, switched transmit diversity, contrasted with using side information to select a better antenna. Other embodiments of blind, switched transmit diversity may use unequal duty cycles on the antennas 212 and 214 of the FDD wireless terminal. Knowledge of the forward-link powers received from a plurality of spaced-apart antennas of the FDD wireless terminal, and using them to infer differential receive antenna gains, is also referred to herein as "side information".

Figure 3:
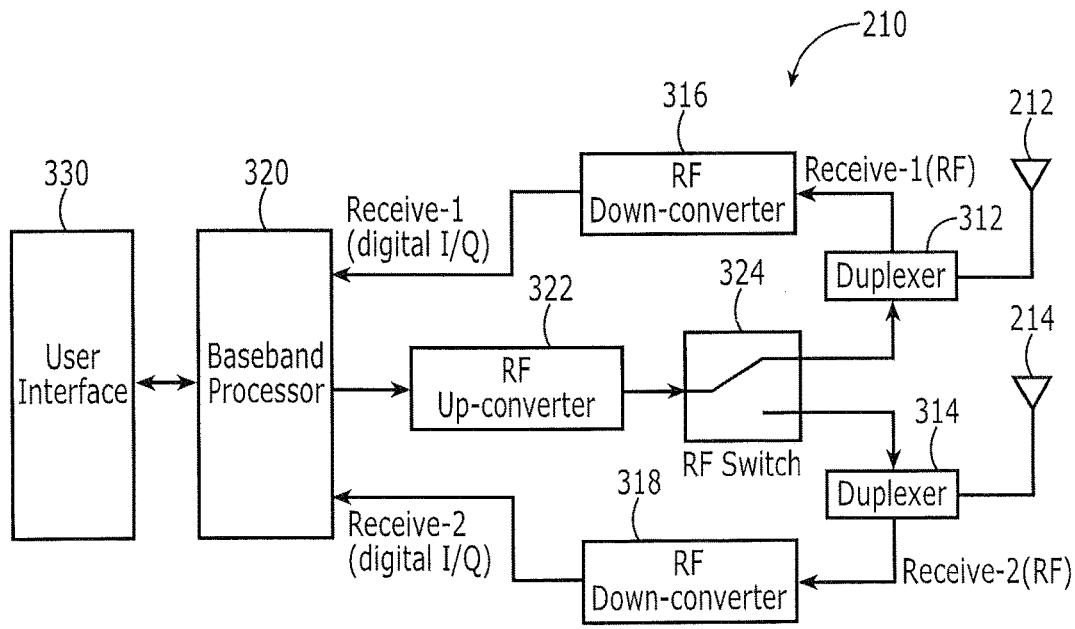
FIG. 3 is a block diagram of an FDD wireless terminal according to various embodiments described herein.

FIG. 3 is a block diagram of an FDD wireless terminal that can provide switched transmit diversity according to various embodiments described herein, and may correspond to FDD wireless terminals 210 of FIGS. 2A and 2B. Two spaced-apart antennas 212 and 214 are shown. The antennas are connected to duplexers 312, 314, which can be used to switch between transmit and receive modes. Forward link signals that are received at the two spaced-apart antennas 212 and 214, pass through Radio Frequency (RF) downconverters 316, 318, respectively, and are then provided to a processor 320, also referred to herein as a "baseband processor." Transmit signals are provided to an RF upconverter 322, and then are switched by an RF switch 324 to one or the other duplexers 312 or 314 for diversity transmission by antenna 212 or 214. A user interface 330 is also provided that can include a display, keyboard, pointing device, touch screen, microphone, ear speaker and/or loudspeaker, as is well known to those having skill in the art.

An architecture as illustrated in FIG. 3 may be used to implement various embodiments described herein. It is generally desirable that the forward link powers, Pr1 and Pr2, be observable substantially simultaneously and continuously. In FIG. 3, this is achieved by having a receive diversity system in addition to switched transmit diversity. The architecture of FIG. 3 also corresponds to direct quadrature down-conversion to digital complex baseband. This architecture is common for modern cellular device platforms, although various other embodiments may be equally applicable to other wireless terminal architectures. The powers received by the two receive diversity paths are computed in the baseband processor 330, which can be embodied as a micro-computer running signal and/or protocol processing tasks. Various operations, described below and illustrated in FIGS. 4-7, may be used to decide which mode of transmit diversity, blind or side-information-based, is used.

Figure 4:
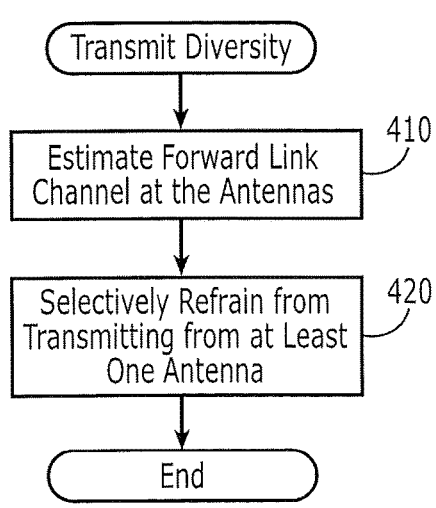
FIGS. 4-7 are flowcharts of various operations that may be performed to provide transmit diversity in FDD wireless terminals according to various embodiments described herein.

More specifically, FIG. 4 is a flowchart illustrating operations that may be performed to provide transmit diversity according to various embodiments described herein. These embodiments may be performed by a processor, such as the baseband processor 320 of FIG. 3, to control a transmitter, including, for example, the RF upconverter 322, the RF switch 324, the duplexers 312 and 314 and/or the antennas 212, 214 of FIG. 3, and also to control a receiver, including, for example, the antennas 212, 214, the duplexers 312, 314 and the RF downconverters 316 and 318 of FIG. 3. More specifically, referring to FIG. 4, at Block 410, channel estimating of the forward link that is received at the plurality of spaced-apart antennas 212, 214 is performed. Then, at Block 420, the transmitter is controlled to selectively refrain from transmitting over the return link from at least one of the plurality of spaced-apart antennas 212, 214 in response to the channel estimating of the forward link that is received at the plurality of spaced-apart antennas at Block 410. It will be understood that selectively refraining may take place for the duration of a given voice, multimedia and/or data communication in some embodiments, or may only take place for a portion of a given voice, multimedia and/or data communication in other embodiments.

Figure 5:
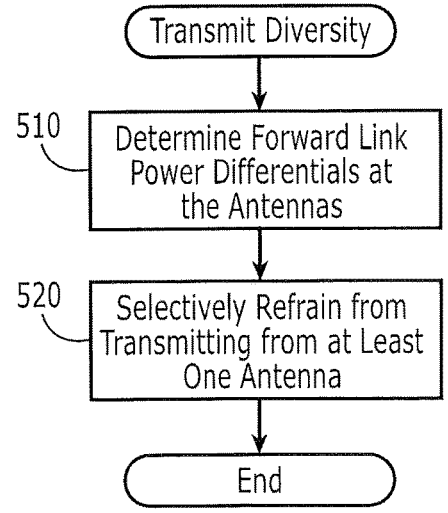

In other embodiments, as illustrated in FIG. 5, transmit diversity is obtained by determining differentials in forward link power that is received at the plurality of spaced-apart antennas 212, 214 at Block 510. The transmitter is then controlled at Block 520 to selectively refrain from transmitting over the return link from at least one of the plurality of spaced-apart antennas 212, 214 in response to the differentials in forward link power that is received at the plurality of spaced-apart antennas 212, 214.

Figure 6:
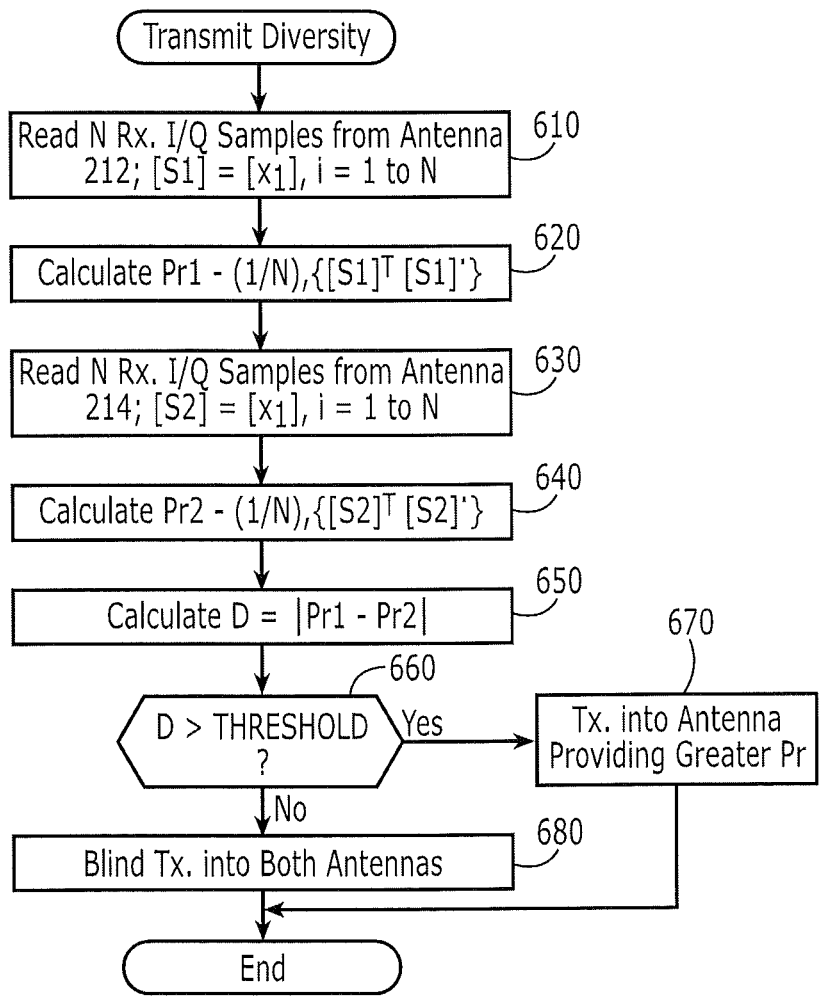

FIG. 6 illustrates more detailed embodiments. In particular, referring to FIG. 6, at Block 610, N received (Rx.) in-phase and quadrature phase (I/Q) samples are read from antenna 212 and, at Block 620, a time averaged received power level Pr1 is calculated. Similarly, at Block 630, N received I/Q samples are read from the second antenna 214 and at Block 640, the received power level Pr2 from antenna 214 is calculated. The averaging duration may be set by the parameter, N, which represents the averaging time for a given sampling rate.

Then, at Block 650, a difference D between the two time-averaged received signal levels Pr1 and Pr2 is calculated. A determination is then made at Block 660 as to whether D=|Pr1−Pr2| is less than a threshold value THRESHOLD. When the time-averaged, received signal levels, Pr1 and Pr2 (for example in dB) of Blocks 620 and 640, are within defined bounds of similarity, i.e., D=|Pr1−Pr2| is less than a threshold value THRESHOLD, a technique of blind switched transmit (Tx.) diversity, where no side-information is assumed, may be used at Block 680.

One technique for blind switched transmit diversity of Block 680 includes transmitting 50% of a transmit frame through one antenna 212 and the remaining 50% of the frame through the other antenna 214. In the absence of any a priori knowledge about which is instantaneously the better channel, and given that the channel will be time varying in an unpredictable way owing to multipath fading, which has been observed in field trials even for completely stationary terminals, this may be the best approach. Forward Error Correction (FEC) and soft decision combining may be used at the receiver, so that it is possible to decode a frame (up to a certain level of received signal to noise ratio) even when one half is erased owing to poor channel conditions. Other techniques may use uneven duty cycles.

In contrast, at Block 670, when it can be detected at Block 660 that Pr1 and Pr2 are quite different, perhaps owing to a combination of hand/head blockage and placement on the device (such as having the main lobe of the pattern of one antenna pointing away from the satellite and the other antenna pointing toward the satellite), it may be wasteful of transmit power to blindly put equal power in both antennas 212, 214. In such cases, the antenna receiving greater power in the forward direction is selected for return link transmission from the FDD wireless terminal at Block 670. In making the above determination, that is which antenna is receiving greater power in the forward link, time averaging may be used to average out multipath fading. The averaging period should be sufficiently long to remove slow variations owing to multipath fading but should not be excessively long so as to be unable to track likely movements of the hand/head and the user orientation relative to the base station. Additionally, the threshold value of |Pr1−Pr2| at which the diversity algorithm switches from "equal power sent to both antennas" to "pick one antenna", may also be set optimally.

The averaging period and/or threshold parameters may be made either fixed or configurable, with the configuration being controlled by the network and downloaded to the device locally and/or remotely (over the air) and/or being controlled by the device. Configurability can allow optimum parameters to be set for different for different classes of terminals. In addition, the parameters may vary over time, for example as greater operational experience is gained.

Figure 7:
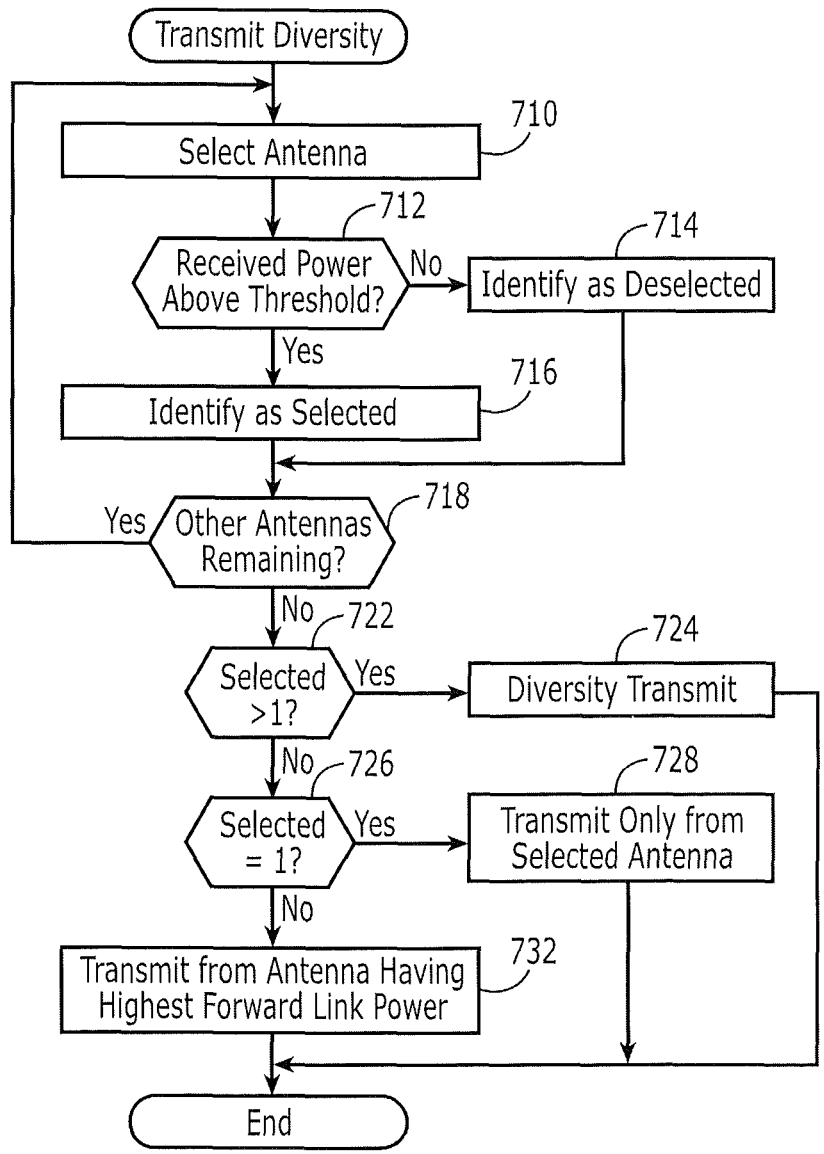

Operations of FIG. 6 may be extended to the case of more than two spaced-apart antennas on the FDD wireless terminal, as illustrated in FIG. 7. Initially, all of the antennas are examined and the received power is compared to a threshold at Blocks 710-718. Specifically, for a given antenna, at Block 710, a determination is made as to whether the received power is above a threshold at Block 712. If not, the antenna is identified as being deselected at Block 714 and if yes, the antenna is identified as being selected at Block 716. These operations continue at Block 718 until all of the antennas have been measured and classified.

In these embodiments, the sets of selected (Block 716) and de-selected (Block 714) antennas, based on the received power of each relative to a threshold value (Block 712), may have more than one entry. Referring to Block 722, when more than one antenna is selected, blind switched (alternating) diversity transmission may be used for all such selected antennas, as illustrated in Block 724. All de-selected antennas are ignored for transmissions. On the other hand, if only one antenna has been selected at Block 726, then at Block 728 transmission takes place only from the one selected antenna. Finally, if no antennas have been selected at Block 726, indicating that all antennas have power below the threshold, the antenna with the highest power is selected for transmission continuous, ignoring the threshold value, at Block 732.

Accordingly, various embodiments described herein can operate in a frequency division duplex wireless communication system, involving a forward link and a return link at a duplex frequency spacing, and can provide methods, devices and systems of switched, return-link transmit diversity involving transmissions for a user device having a multiplicity of antennas, where forward-link channel estimation is used as a basis for selecting the transmit antenna on the device. The channel estimation may involve measuring the forward link power over an averaging period, where the averaging period is configurable by the network, wherein the configurability is achieved locally by the device, and/or where the configurability is achieved remotely, including over-the-air downloading of the configuration parameter(s).

The channel estimation may include estimating the differential gains of the antennas on the user device, averaged over all angles-of-arrival relevant to the reception of the forward link transmission, thereby detecting cases of differential blockage faced by the antennas. The antennas may be divided into a set having blockage below a threshold value and those having blockage greater than a threshold value. Antennas having blockage greater than a threshold value are deselected from the list of antennas used for return-link transmissions, except for the case where all antennas have blockage greater than the threshold, in which case the antenna with the least blockage may be selected for transmission. Where only one antenna is in the list of antennas with blockage below the threshold value, that antenna may be selected for transmission. Finally, where more than one antenna is in the list of antennas with blockage below the threshold value, all such antennas may be used for blind transmission using any switched diversity method that does not use a priori knowledge of the condition of the channel from the selected antennas to the receiver.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A transmit diversity method for a Frequency Division Duplex (FDD) wireless terminal, the FDD wireless terminal comprising a plurality of spaced-apart antennas that are configured to transmit over a return link and to receive over a forward link that is spaced apart from the return link in frequency, the transmit diversity method comprising:
selectively refraining from transmitting over the return link from at least one, but less than all, of the plurality of spaced-apart antennas of the FDD wireless terminal in response to channel estimating of the forward link that is received at the plurality of spaced-apart antennas of the FDD wireless terminal,
wherein the channel estimating of the forward link that is received at the plurality of spaced-apart antennas of the FDD wireless terminal comprises estimating differential blockages of the forward link at the plurality of spaced-apart antennas of the FDD wireless terminal, and
wherein estimating differential blockages of the forward link at the plurality of spaced-apart antennas of the FDD wireless terminal comprises estimating differential gains of the plurality of spaced-apart antennas of the FDD wireless terminal, averaged over angles of arrival of the forward link.

2. The method according to claim 1 wherein the channel estimating of the forward link that is received at the plurality of spaced-apart antennas of the FDD wireless terminal comprises measuring forward link power at the plurality of spaced-apart antennas of the FDD wireless terminal over an averaging period.

3. The method according to claim 2 wherein the averaging period is configured by a wireless network and tra1wmitted to the FDD wireless terminal and/or is configured by the FDD wireless terminal.

4. The method according to claim 1 wherein estimating differential blockages of the forward link at the plurality of spaced-apart antennas of the FDD wireless terminal includes estimating differential blockages that are caused by appendages of a user of the FDD wireless terminal.

5. The method according to claim 1 wherein estimating differential blockages of the forward link at the plurality of spaced-apart antennas of the FDD wireless terminal comprises determining blockage levels at the plurality of spaced-apart antennas of the FDD wireless terminal relative to a threshold blockage level.

6. The method according to claim 5 wherein selectively refraining from transmitting over the return link from at least one, but less than all, of the plurality of spaced-apart antennas of the FDD wireless terminal comprises selectively refraining from transmitting over the return link from at least one, but less than all, of the plurality of spaced-apart antennas of the FDD wireless terminal that has a blockage level that is greater than the threshold blockage level.

7. The method according to claim 5 wherein selectively refraining from transmitting over the return link from at least one, but less than all, of the plurality of spaced-apart antennas of the FDD wireless terminal comprises determining that all of the plurality of spaced-apart antennas of the FDD wireless tem1inal have blockage levels greater than the threshold blockage level and wherein the method farther comprises transmitting over an antenna of the FDD wireless tem1inal having lowest blockage level.

8. The method according to claim 5 wherein selectively refraining from transmitting over the return link from at least one, but less than all, of the plurality of spaced-apart antennas of the FDD wireless terminal comprises determining that only one of the antennas of the FDD wireless terminal has a blockage level less than the threshold blockage level and wherein the method further comprises transmitting over only the one antennal of the FDD wireless terminal.

9. The method according to claim 5 wherein selectively refraining from transmitting over the return link from at least one, but less than all, of the plurality of spaced-apart antennas of the FDD wireless terminal comprises determining that two or more of the antennas of the FDD wireless terminal have blockage levels less than the threshold blockage level and wherein the method further comprises alternately transmitting over the two or more antennas of the FDD wireless terminal.

10. A Frequency Division Duplex (FDD) wireless terminal, comprising:
a plurality of spaced-apart antennas;
a transmitter that is configured to transmit over a return link from the plurality of spaced-apart antennas of the FDD wireless terminal;
a receiver that is configured to receive over a forward link that is spaced apart from the return link in frequency, from the plurality of spaced-apart ante=s of the FDD wireless terminal; and
a processor that is configured to control the transmitter to selectively refrain from transmitting over the return link from at least one, but less than all, of the plurality of spaced-apart antennas of the FDD wireless terminal in response to channel estimating of the forward link that is received at the plurality of spaced-apart antennas of the FDD wireless terminal,
wherein the channel estimating of the forward link that is received at the plurality of spaced-apart antennas of the FDD wireless terminal comprises measuring forward link power at the plurality of spaced-apart antennas of the FDD wireless terminal over an averaging period,
wherein the channel estimating of the forward link that is received at the plurality of spaced-apart antennas of the FDD wireless terminal comprises estimating differential blockages of the forward link at the plurality of spaced-apart antennas of the FDD wireless terminal, and
wherein estimating differential blockages of the forward link at the plurality of spaced-apart antennas of the FDD wireless terminal comprises estimating differential gains of the plurality of spaced-apart antennas of the FDD wireless terminal, averaged over angles of arrival of the forward link.

11. The FDD wireless terminal according to claim 10, wherein the averaging period is configured by a wireless network and transmitted to the FDD wireless terminal and/or is configured by the FDD wireless terminal.

12. The FDD wireless terminal according to claim 10, wherein the estimating differential blockages of the forward link at the plurality of spaced-apart antennas of the FDD wireless terminal includes estimating differential blockages that are caused by appendages of a user of the FDD wireless terminal.

13. The FDD wireless terminal according to claim 10 wherein estimating differential blockages of the forward link at the plurality of spaced-apart antennas of the FDD wireless terminal comprises determining blockage levels at the plurality of spaced-apart antennas of the FDD wireless terminal relative to a threshold blockage level.

14. The FDD wireless terminal according to claim 13 wherein the processor is configured to control the transmitter to selectively refrain from transmitting over the return link from at least one, but less than all, of the plurality of spaced-apart antennas of the FDD wireless terminal by controlling the transmitter of perform operations comprising selectively refraining from trans1ni.tting over the return link from at least one, but less than all, of the plurality of spaced-apart antennas of the FDD wireless terminal that has a blockage level that is greater than the threshold blockage level.

15. The FDD wireless terminal according to claim 13 wherein the processor is configured to control the transmitter to selectively refrain from transmitting over the retun1link from at least one, but less than all, of the plurality of spaced-apart antennas of the FDD wireless terminal by controlling the transmitter of perfom1operations comprising determining that all of the plurality of spaced-apart antennas of the FDD wireless terminal have blockage levels greater than the threshold blockage level and wherein the method further comprises transmitting over an antenna of the FDD wireless terminal having lowest blockage level.

16. The FDD wireless terminal according to claim 13 wherein the processor is configured to control the transmitter to selectively refrain from transmitting over the return link from at least one, but less than all, of the plurality of spaced-apart antennas of the FDD wireless terminal by controlling the transmitter of perform operations comprising determining that only one of the antennas of the FDD wireless terminal has blockage level less than the threshold blockage level and wherein the method further comprises transmitting over only the one antenna of the FDD wireless terminal.

17. The FDD wireless terminal according to claim 13 wherein selectively the processor is configured to control the transmitter to selectively refrain from transmitting over the return link from at least one, but less than all, of the plurality of spaced-apart antennas of the FDD wireless terminal by controlling the transmitter of perform operations comprising determining that two or more of the antennas of the FDD wireless terminal have blockage levels less than the threshold blockage level and wherein the method further comprises alternately transmitting over the two or more antennas of the FDD wireless terminal.

* * * * *